United States Patent [19]

Kang

[11] Patent Number: 5,752,995
[45] Date of Patent: May 19, 1998

[54] CATALYST AND PROCESS FOR THE PRODUCTION OF HYDROGEN AND/OR METHANE

[76] Inventor: Chia-chen Chu Kang, 301 Gallup Rd., Princeton, N.J. 08540

[21] Appl. No.: 268,331

[22] Filed: Jun. 30, 1994

[51] Int. Cl.$^6$ .................... B01J 23/10; C01B 3/26
[52] U.S. Cl. ............ 48/198.7; 252/373; 423/654; 502/302; 502/303; 502/304
[58] Field of Search .................. 423/648.1, 652, 423/653, 654; 502/302, 303, 304; 252/373; 48/198.7

[56] References Cited

U.S. PATENT DOCUMENTS

| | | |
|---|---|---|
| 1,938,202 | 12/1933 | Williams .................... 423/654 |
| 3,737,291 | 6/1973 | Chonore et al. ............. 423/654 |
| 4,142,962 | 3/1979 | Yates et al. ................. 423/654 |
| 4,285,837 | 8/1981 | Sato et al. ................... 423/654 |
| 5,397,758 | 3/1995 | Bourruetaubertot et al. ... 502/302 |
| 5,484,756 | 1/1996 | Isomae ........................ 502/304 |

*Primary Examiner*—Wayne Langel
*Attorney, Agent, or Firm*—Fred A. Wilson

[57] ABSTRACT

A rare earth oxide stabilized, cobalt promoted nickel catalyst supported on refractory material, and a process employing said catalyst for the production of hydrogen-containing gases, such as synthesis gas, reducing gas or town's gas, or for the production of methane-enriched gases, such as pipeline gas at low steam-to-carbon ratio not above 3.5 from various hydrocarbon feedstocks.

15 Claims, No Drawings

CATALYST AND PROCESS FOR THE PRODUCTION OF HYDROGEN AND/OR METHANE

BACKGROUND OF INVENTION

This invention pertains to an alkali-free, rare earth oxide stabilized, cobalt promoted nickel catalyst composition. It also pertains to a catalytic process for production of hydrogen-rich or methane-rich gases employing the catalyst.

In the production of hydrogen and methane-containing gases by steam reforming of hydrocarbon feeds, a catalyst comprised of nickel on a refractory support is generally used commercially. When methane is the feed material, there is a tendency for carbon to be deposited on the catalyst, and when reforming feedstocks containing higher paraffins and/ or unsaturated hydrocarbons such as olefins and aromatics, such deposition of carbon takes place more severely. The deposition of carbon deactivates the catalyst and/or disintegrates the catalyst and also causes an undesirable pressure drop in the catalytic reactor. As a result, the unit must frequently be shutdown in order to steam off the carbon, and in case of severe carbon deposition the catalyst must be replaced.

One method for minimizing the deposition of carbon on the catalyst in steam reforming process is to use a considerable excess of steam, but this procedure renders the process more expensive.

To provide a method for operating steam reforming processes at economically feasible levels of steam, a nickel or cobalt catalyst promoted with an alkali compound, such as a potassium compound, can be used, e.g., of the type disclosed in British Patent No. 1,095,997 or in U.S. Pat. No. 3,417,029. However, under relatively high operating temperatures alkali-promoted catalysts suffer loss of the alkali through vaporization. Such a loss not only causes the catalyst to lose its ability to reduce carbon deposition, but also causes the alkali to be deposited in equipment downstream of the reactor such as in heat exchangers or waste heat boilers, resulting in severe fouling of the equipment and in loss of heat exchange efficiency.

U.S. Pat. No. 3,945,944 discloses a cobalt promoted nickel catalyst for which steam requirements are significantly lower than those required when employing a commercial nickel catalyst. The presence of cobalt promotes the steam-carbon reaction, and thus retards the carbon deposition on the catalyst. Recently a commercial naphtha steam-reforming nickel catalyst containing a rare earth oxide was announced in China by Min Enze and Zhou Peiling. The rare earth oxide is incorporated with the active components by coprecipitation. After commercial trial for one year, the rare earth oxide-nickel catalyst is more resistant to carbon deposition than the nickel catalyst without the rare earth oxide present. The rare earth oxide stabilizes the nickel catalyst through its ability to postpone the nickel crystal growth, and thus retards the rate of deactivation and carbon deposition.

The current commercial steam reforming process is operated at a steam-to-carbon ratio of 3.5. This is mandated by the commercial steam reforming catalysts available. Generally, a nickel-containing catalyst is employed for methane or natural gas feed, and a alkali-promoted nickel catalyst for naphtha feed. This steam-to-carbon ratio of 3.5 is much higher than the thermodynamic minimum steam-to-carbon ratio of 0.9 for natural gas feed or 1.2 for naphtha feed.

SUMMARY OF INVENTION

It is an object of the present invention to provide a new and improved catalyst for the production of hydrogen-rich or methane-rich gases, which catalyst is capable of providing operations at relatively low steam-to-carbon ratios without deleterious carbon deposition on the catalyst, and has a long life at high operating temperatures.

Another object is to provide an improved catalyst for the conversion of feedstocks selected from methyl fuel or a hydrocarbon mixture comprising paraffins, naphthenes, olefins and aromatics to produce a hydrogen-rich or methane-rich product gas at steam requirements which are significantly lower than those required by employing a standard nickel catalyst.

Still another object is to provide a catalyst and process for the production of methane-enriched gas, such as pipeline gas.

A further object of this invention is to provide a process for the production of hydrogen-containing gaseous product, such as synthesis gas, reducing gas or town's gas employing the catalyst.

Various other objects and advantages of this invention will become apparent from the accompanying description.

CATALYST MATERIAL

According to this invention, a new and improved catalyst is provided, which comprises a member of the group of a rare earth oxide, such as lanthanum oxide or cerium oxide and mixtures thereof, or any single or combination of various rare earth oxides, a member of the group consisting of elemental cobalt, a reducible compound of cobalt and mixtures thereof, a member of the group consisting of elemental nickel, a reducible compound of nickel and mixtures thereof, and a refractory material comprised of at least one member taken from the group consisting of oxides of aluminum, silicon, magnesium, calcium, titanium and compounds thereof, said catalyst being substantially free of alkali compounds. The choice of rare earth oxide is generally governed by its availability. The most abundant rare earth oxides are lanthanum and cerium oxides, and the least expensive rare earth oxides are the naturally occurring rare earth oxides. The rare earth oxide content of this catalyst should be at least about 0.2 weight percent calculated as the rare earth oxides, generally between about 0.2 and about 15 weight percent. The cobalt content of this catalyst should be at least about 0.1 weight percent, generally between about 0.5 and about 25 weight percent. The nickel content of this catalyst should be at least about 0.1 weight percent, generally between about 0.5 and about 50 weight percent. In all cases the ranges above refer to the respective contents after calcination of the catalyst.

The remainder of the catalyst is comprised of a refractory support containing one or more of the oxides of aluminum, calcium, silicon, magnesium or titanium or compounds thereof. The catalyst may also contain a naturally-occurring support material such as bauxite or kaolin. The preferred refractory support for the catalyst is aluminum oxide or a mixture of aluminum oxide and calcium oxide. The surface area of the refractory support should be in the range from about 1 to about 100 square meters per gram. A lubricating or binding agent such as graphite or stearic acid may be included to facilitate the forming of catalyst powder into desired shapes for the catalyst.

The catalyst of the invention can be prepared in various ways. The preferred method of preparation is by impregnating a refractory support material with a solution of rare earth salt first, then with a solution of cobalt and nickel salts, such as nitrates, which salts upon subsequent heat treatment will decompose to form the corresponding oxides. After such impregnation, the composite material is dried at about 250° F. and calcined at temperature of 4000° to 3000° F. It is essential to impregnate the refractory support with a solution of a single rare earth salt or a mixture of rare earth salts first, followed by the above mentioned drying and calcining steps to result in a single rare earth oxide or a mixture of rare earth oxides to modify the surface of the refractory support. This modified surface has a greater affinity for the cobalt and nickel, and that affinity slows the cobalt and nickel crystal growth on an unmodified support surface. Such crystal growth results in lower cobalt and nickel surface area, thus reduces the rate of steam reforming of hydrocarbon reactions and accelerates carbon deposition on the catalyst. The surface-modified refractory support is then impregnated with a solution of cobalt and nickel salts followed by the above-mentioned drying and calcining. This method of impregnation of the support material is simpler than impregnation with one metal salt solution first, then followed by impregnation with the other metal salt solution. The catalyst may be prepared either by a coprecipitation technique or by mixing the components in the form of fine powders without departing from the scope of this invention.

The catalyst can be shaped into a variety of common shapes and sizes, such as cylindrical rings or pellets of various sizes.

Prior to use, the catalyst can subsequently be subjected to a reduction treatment at elevated temperatures, e.g., at the process temperature, in the presence of a reducing medium such as hydrogen or a mixture of hydrogen and steam. This treatment is conveniently carried out in the reactor prior to the introduction of feed thereto. In the case of steam reforming of a feed containing predominantly methane, the catalyst can be reduced during the reforming operations and the separate reduction step is omitted.

The present invention teaches that the surface of a catalyst refractory support modified by coating with a mixture of rare earth oxides or a single rare earth oxide slows the growth of cobalt and nickel crystals, postpones the catalyst deactivation of steam reforming of hydrocarbon reactions and decreases carbon deposition. The specific advantage of the catalyst of this invention is that the catalyst simultaneously exhibits the following qualities: (1) it is capable of operations at low steam-to-carbon ratio without imposing limitations on maximum operating temperature, (2) it is active at low temperatures such as at 600° F. and below, and (3) it has long active life, i.e., it maintains acceptable catalytic activity for a long period of time.

PROCESSES USING CATALYST

In accordance with the present invention, there is also provided a process for the production of gaseous products taken from the group consisting of hydrogen-rich and methane-rich gases, which process comprises contacting a member of the group consisting of hydrogen, methyl fuel and hydrocarbon and mixtures thereof with an oxygen-containing gas taken from the group consisting of steam, air, oxygen, oxides of carbon and mixtures thereof, over a catalyst which comprises a member of the group consisting of a single rare earth oxide or mixture of rare earth oxides, a member of the group consisting of elemental cobalt, a reducible compound of cobalt and mixtures thereof, a member of the group consisting of elemental nickel, a reducible compound of nickel and mixtures thereof, and a refractory material comprised of at least one member taken from the group consisting of oxides of aluminum, silicon, magnesium, calcium, titanium and compounds thereof, said catalyst being substantially free of alkali. Particular applications of the process is in the steam reforming of one or more hydrocarbons to produce hydrogen or methane-rich gases, and in the methanation of hydrogen and carbon oxides-containing gases to produce methane-enriched gases.

The process of this invention can be carried out over a wide range of operating conditions including temperatures between about 4000° and about 2200° F., pressures from about 0 to about 1500 psig, and steam-to-carbon ratios from about 0 to about 3.5. The levels of these conditions are dictated by the desired product gas composition and the equilibrium gas composition as well as the temperature and pressure levels of any subsequent process step and the overall economics of the process. Generally, for the production of hydrogen-rich gas, the operation is carried out at high temperature and low to medium pressure, whereas for the production of methane-rich gas the process is effected at low temperature and relatively high pressure.

In carrying out the process of the invention, the oxygen-containing gas can be taken from the group consisting of steam, air, oxygen, oxides of carbon and mixtures thereof. For steam reforming of a hydrocarbon feed, steam and/or carbon dioxide can be used, with steam being the preferred gas. However, other members of the above-mentioned group can be used for certain specific applications of the steam-reforming, for example, a mixture of steam and air is used when the product is an ammonia synthesis gas. For methanation, the oxygen-containing gas is a carbon oxide, usually a mixture of carbon monoxide and carbon dioxide, which is reacted with hydrogen feed to form methane.

The catalytic steam reforming process of this invention is applicable to methyl fuel and a great variety of hydrocarbon feedstocks including paraffins, naphthenes, olefins and aromatics, said feedstocks ranging from one to forty carbon atoms per molecule. The hydrocarbon feedstocks can be a single hydrocarbon such as methane, ethane, ethylene, propane, propylene, butane, etc., or mixtures thereof including natural gas and its condensate, petroleum refinery and petrochemical streams such as refinery gases, by-products from ethylene plants, etc., and various petroleum fractions such as light naphtha, heavy naphtha, gas oil, etc. The term "methyl fuel" is defined as crude methanol made from natural gas to facilitate shipping.

For the steam reforming process of the present invention, the relative amount of steam and hydrocarbon reactants is expressed as the steam-to-carbon ratio, which is the number of moles steam per atom of carbon in the hydrocarbon charged to the reactor. For example, a reactor charge of six moles of steam per mole of ethane corresponds to a steam-to-carbon ratio of 3.0. Minimum steam-to-carbon ratio is the ratio below which the rate of carbon deposition is sufficiently rapid to cause a significant rise in pressure drop across the catalyst bed. To those skilled in the art, it is known that the minimum steam-to-carbon ratio varies with the hydrocarbon feed. Among paraffins, olefins, and aromatics having the same number of carbon atoms, the minimum steam-to-carbon ratio increases with increasing degree of unsaturation in the hydrocarbon, i.e., paraffins need the lowest ratio and aromatics the highest ratio. Within the same group of hydrocarbons, the minimum steam-to-carbon ratio increases with increasing molecular weight. The steam-to-carbon ratio required to provide a reasonable period of carbon-free operation in a commercial unit is usually higher than the minimum steam-to-carbon ratio. For economical and reaction-equilibrium considerations the steam-to-carbon ratio is preferred to be about 3.5 or less.

In order to place the variety of hydrocarbon feeds on the same space velocity basis, the space velocity is expressed herein as standard volume of $C_1$ hydrocarbon equivalent feed per hour per volume of catalyst. For example, when feeding two gram moles of hexane per hour over one liter of catalyst, the equivalent $C_1$ space velocity is (2) (6) (22.4)= 268.8 lit./hr./lit. Space velocity in the catalytic reforming process of this invention ranges broadly between about 100 and about 20,000 v/hr./v.

A detailed discussion is provided below covering the preferred steam reforming conditions for three commercial gas products, namely, reducing gas, synthesis gas and town's gas.

In the production of reducing gas used, for example, in the direct reduction of iron ore, it is necessary for economic reasons to keep the steam-to-carbon ratio extremely low in order to produce a gas product, which does not require drying prior to its introduction to the reducing zone. Generally, the reducing gas should contain at least 88 mole percent of hydrogen and carbon monoxide on a wet basis. The process is carried out at the high end of the temperature range and low end of the pressure range, for example, at reactor outlet temperatures of between about 1800° F. and about 2200° F. and at pressure from about 0 to about 150 psig. The steam-to-carbon ratio ranges from about 0.9 to about 1.3 and the $C_1$ equivalent space velocity is maintained between about 100 to about 2000 v/hr/v. The feed to the process is usually a low molecular weight hydrocarbon such as natural gas. The catalyst of this invention is particularly useful in producing this type of reducing gas because of its capability to function well at extremely low steam-to-carbon ratios, i.e., close to stoichiometric requirements or thermodynamic minimum requirements, without encountering carbon deposition.

When employing the catalyst of the invention to produce synthesis gas for the manufacture of ammonia or methanol, a variety of hydrocarbon feeds can be used ranging from normally gaseous feeds such as natural gas to normally liquid feeds such as naphtha or higher boiling petroleum fractions. The preferred operating conditions include reactor outlet temperatures between about 1300° F. and about 1800° F., pressures from about 50 to about 1000 psig., steam-to-carbon ratios in the range between about 1.0 and about 3.5 and $C_1$ equivalent space velocity generally up to about 4000 v/hr/v. With heavier feedstocks the space velocity is maintained at relatively low values, while with lighter feeds it is possible to operate at higher values. For instance, space velocities of 3000 and higher can be employed when reforming natural gas over the catalyst of the invention.

When the catalyst of the present invention is employed to produce reducing gas or synthesis gas, the surface area of its refractory support is preferred to be at the low end of the range, between about 1 and about 10 square meters per gram, the rare earth oxide content of the catalyst is preferred to be between about 0.2 and about 2 weight percent, the cobalt content of the catalyst is preferred to be between about 0.1 and about 5 weight percent, and the nickel content of the catalyst is preferred to be between about 0.1 and 10 weight percent.

When the catalyst of the present invention is employed to convert hydrocarbons other than methane to methane-rich town gas with moderately high heating values such as about 500 B.T.U. per standard cubic foot, the conditions are preferably maintained at about 7000° to about 1200° F., between about 300 to about 800 psig., from about 1.2 to about 3.5 steam-to-carbon ratio and at a high space velocity, such as between about 1000 and about 20,000 $C_1$ equivalent velocity.

The production of methane-enriched gas such as pipeline gas containing about 90 mole percent of methane or more can be carried out by first producing a methane-rich gas under conditions suitable for town's gas production, followed by a methanation reaction promoted by the catalyst of the invention to convert hydrogen and carbon oxides produced in the first reaction into methane. Water and carbon dioxide are subsequently removed from the methanation product. In the methanation reaction two major reactions occur:

$$CO+3H_2 \rightleftharpoons CH_4+H_2O$$
$$CO_2+4H_2 \rightleftharpoons CH_4+2H_2O$$

Both reactions are exothermic and are favored by low temperature. Although the overall reaction is favored by low partial pressure of steam, it is not necessary to remove steam from the feed to the methanation zone, i.e., the effluent from the reforming zone. Since the reforming reaction is endothermic and the methanation reaction is exothermic and the latter is favored by a lower temperature than the former, it is advantageous to effect the process in two or more stages, which may be contained in a single vessel or a multiple of vessels. The multiple stage system possesses the advantage in that external means can be provided for cooling between stages resulting in high thermal efficiency of the process. Since water is one of the products of the methanation reactions, water can be removed between stages so as to drive the reactions towards completion. An almost pure methane product can be produced after removal of carbon dioxide by conventional means. The methanation step is preferably carried out between about 400° and about 800° F., from about 300 to about 800 psig, from about 1000 to about 10,000 $C_1$ equivalent space velocity and at steam-to-carbon ratios from about 0 to about 1.5. For the methanation step, steam-to-carbon ratio and $C_1$ equivalent space velocity are based on the total carbon atoms including carbon oxides present in the feed.

When employing the catalyst of the present invention to produce methane-rich town gas or methane-enriched gases such as pipe-line gas, the surface area of the catalyst refractory support is preferred to be at the high end of the range, between about 5 and about 100 square meters per gram, the rare earth oxide content of the catalyst is preferred to be between about 1.5 and about 15 weight percent, the cobalt content of the catalyst is preferred to be between about 1 and about 15 weight percent, and the nickel content is preferred to be between about 1 to 25 weight percent.

It is to be understood that the scope of the present invention as it pertains to the production of methane-enriched gas also includes the methanation of hydrogen and carbon oxide-containing gaseous mixtures other than reformer effluents. Also, the carbon dioxide removal step may be omitted, if desired.

EXAMPLE

The following example is provided to illustrate the present invention.

CATALYST SUPPORT

The catalyst support is $\alpha$-$Al_2O_3$, for which the pore characteristics are shown in Table I below.

TABLE I

PORE CHARACTERISTICS OF CATALYST SUPPORT

| | |
|---|---|
| Total Pore Vol., cc/g | 0.2 |
| Surface Area, m²/g | 3 |
| Average Pore Dia., Å | 4,000 |

| Pore Size Distribution Dia., Å | Vol. Percent |
|---|---|
| <1,000 | 0 |
| 1,000–2,000 | 19.7 |
| 2,000–4,000 | 28.3 |
| 4,000–6,000 | 22.5 |
| 6,000–10,000 | 14.0 |
| >10,000 | 15.5 |

CATALYST A

Catalyst A is prepared by first impregnating the catalyst support (12–/20 mesh size) with a solution of lanthanum nitrate in an amount sufficient to yield 1.5% of lanthanum oxide. The impregnated material is dried at 250° F. and calcined to convert lanthanum nitrate to lanthanum oxide. The rare earth oxide coated support is then impregnated with a solution of nickel nitrate in an amount sufficient to yield 2 weight percent nickel oxide. The impregnated material is dried at 250° F. and calcined to convert the nickel nitrate to nickel oxide.

CATALYST B

Catalyst B is prepared by impregnating the catalyst support (12–20 mesh size) with a solution of nickel nitrate and cobalt nitrate in an amount sufficient to yield 2 wight percent nickel oxide and 2 wight percent cobalt oxide. The impregnated material is dried at 250° F., then calcined to convert the nickel nitrate and cobalt nitrate to nickel oxide and cobalt oxide.

CATALYST C

Catalyst C is prepared by first impregnating the catalyst support (12–20 mesh size) with a lanthanum nitrate solution in an amount sufficient to yield 1.5% of lanthanum oxide. The impregnated material is dried at 250° F. and calcined to convert lanthanum nitrate to lanthanum oxide. The rare earth oxide coated support is then impregnated with a solution of nickel nitrate and cobalt nitrate in an amount sufficient to yield 2 weight percent nickel oxide and 2 weight percent cobalt oxide. The impregnated material is dried at 250° F. and calcined to convert the nitrates to nickel oxide and cobalt oxide.

Experiments are made in a tubular reactor fitted with an internal thermowell. The reactor, which is heated in an electrical furnace, is connected with an instrument for measuring the pressure drop across the catalyst bed. The catalyst is charged to the reactor and a layer of Alundum chips is placed above the catalyst to serve as a preheating zone. Water is metered though a calibrated flow meter and vaporized. The gaseous feed is metered separately, preheated and mixed with steam at the reactor inlet. The experiments are conducted at atmospheric pressure. When reduction with hydrogen is carried out, the hydrogen is metered, preheated, and admitted to the reactor. After 2 hours, the hydrogen flow is stopped, and the feed and steam are introduced. During operation the catalyst temperature is measured, and the pressure drop across the catalyst bed is monitored to give an indication whether or not carbon is forming and plugging the bed. The product gas is cooled to remove the unreacted water. The cooled product gas is measured and a sample is taken for analysis.

EXPERIMENTS 1, 2 AND 3

These comparative experiments are conducted employing a laboratory test designed for evaluating the carbon deposition characteristics of the steam reforming catalyst. The minimum steam-to-carbon ratios of Catalyst A, Catalyst B, and Catalyst C are determined under synthesis gas operating conditions. The feed in these experiments is a 1:1 mixture of ethylene and ethane on a volume basis. The operating temperature, pressure, and space velocity are kept at the same levels in these experiments, while the steam-to-carbon ratios are gradually decreased during experimentation. The operating conditions are set forth in Table II.

TABLE II

PRODUCTION OF HYDROGEN-RICH GAS

| Experimental No. | 1 | 2 | 3 |
|---|---|---|---|
| Catalyst Designation | A | B | C |
| Catalyst Composition | | | |
| $La_2O_3$, wt, % | 1.5 | 0 | 1.5 |
| CO, wt, % | 0 | 1.6 | 1.6 |
| Ni, wt, % | 1.6 | 1.6 | 1.6 |
| Feed | ethylene-ethane | ethylene-ethane | ethylene-ethane |
| Catalyst Volume, cc. | 25 | 25 | 25 |
| Hydrogen Reduction | no | no | no |
| Reactor Outlet Temperature (°F.) | 1,400 | 1,400 | 1,400 |
| Reactor Pressure, psig | 0 | 0 | 0 |
| Space velocity, ethylene $C_1$ equivalent cc./hr./cc. cat. | 120–240 | 120–240 | 120–240 |
| Steam-to-carbon ratio | 4.0 | 1.5 | 1.5 |
| Pressure drop increase, inches $H_2O$/hr. | 2 | 2 | 0 |
| Product Gas Analysis, mole % | | | |
| $H_2$ | 73.4 | 70.0 | 72.5 |
| CO | 12.9 | 23.7 | 24.2 |
| $CO_2$ | 13.7 | 5.2 | 3.3 |
| $CH_4$ | 0 | 1.1 | 0 |

Catalyst A, a rare earth oxide stabilized nickel catalyst shows carbon laydown as indicated by an increase in pressure drop across the catalyst bed at a steam-to-carbon ratio of 4.0. Catalyst B, a cobalt promoted nickel catalyst shows tendencies of severe carbon laydown at a low steam-to-carbon ratio of 1.5 as indicated by the pressure drop increase of 2 inches $H_2O$/hr. across the catalyst bed and the presence of a small amount of $CH_4$ in the product gas. Catalyst C, a rare earth oxide stabilized, cobalt promoted nickel catalyst does not show any increase in pressure drop and the product gas contains no methane at a steam-to-carbon ratio to 1.5. After lowering the steam-to-carbon ratio to 1.3, catalyst C starts to show tendencies of carbon deposition as indicated by an increase in pressure drop across the catalyst bed and the $CH_4$ content of the product gas increases. The advantage of rare earth oxide stabilized, cobalt-nickel catalyst is clearly demonstrated.

What is claimed is:

1. A catalyst consisting of a substantially alkali-free, rare earth oxide stabilized, cobalt promoted nickel for the production of gases rich in hydrogen or methane with decreased carbon deposition, said catalyst having been prepared by a method which comprises: providing a refractory material containing at least one member selected from the group consisting of oxides of aluminum, silicon titanium and compounds thereof, and supporting on said refractory material (a) between about 0.2 and about 15 weight percent of a single rare earth oxide or mixtures thereof; and (b) between about 0.1 and 25 weight percent of cobalt, calculated as the metal of a cobalt compound selected from the group consisting of elemental cobalt, a reducible compound of cobalt and mixtures thereof; and (c) between about 0.1 and 50 weight percent of nickel, calculated as the metal of a nickel compound selected from the group consisting of elemental nickel, a reducible compound of nickel and mixtures thereof, said method further comprising the steps of:

(i) impregnating said refractory support material with a solution of at least one rare earth salt; (ii) drying the composite support material resulting from step (i) at about 250° F., followed by calcining it at temperature of 400° to 3,000° F.;

(iii) then impregnating the calcined support material resulting from step (ii) with a solution of cobalt and nickel salts; (iv) drying the composite material resulting from step (iii) at 250° F., followed by calcining at temperature of 400° to 3,000° F.

2. The catalyst of claim 1, in which the surface area of the refractory material ranges between about 1 and about 100 square meters per gram, being between about 1 and about 10 square meters per gram for synthesis gas and reducing gas production, and between about 5 and about 100 square meters per gram for the production of town's gas and pipe-line gas.

3. The catalyst of claim 1, in which the rare earth oxide content of the catalyst is between about 0.2 and about 2 weight percent for synthesis gas and reducing gas production, and between about 1.5 and about 15 weight percent for the production of town's gas and pipe-line gas.

4. The catalyst of claim 1, in which the cobalt content of the catalyst is between about 0.1 and about 5 weight percent for the production of synthesis gas and reducing gas, and between about 1 and about 15 weight percent for the production of town's gas and pipe-line gas.

5. The catalyst of claim 1, in which the nickel content of the catalyst is between about 0.1 and about 10 weight percent for the production of synthesis gas and reducing gas, and between about 1 and about 25 weight percent for the production of town's gas and pipe-line gas.

6. A process for the production of hydrogen-rich gases, namely, synthesis gas and reducing gas, or for the production of methane-rich gases, namely, town's gas and pipe-line gas from hydrocarbon feedstocks, the process employing said catalyst of claim 1, and being carried out at operating conditions including temperature between about 400° and about 2,200° F., pressure from about 0 to about 1,500 psig., $C_1$ equivalent space velocity from about 100 to about 20,000 v/hr/v, and steam-to-carbon ratio of about 0 to 3.5, using oxygen-containing gas taken from the group consisting of steam, air, oxygen, oxides of carbon and mixtures thereof, said hydrocarbon feedstocks including methyl fuel and a variety of single hydrocarbon or mixtures of hydrocarbons including paraffins, naphthenes, olefins and aromatics ranging from one to forty carbon atoms per molecule, natural gas and its condensate, petroleum refinery streams including refinery gases, light naphtha, heavy naphtha and gas oil and petrochemical streams, including hydrocarbon containing by-products from ethylene plants.

7. The process of claim 6, employing the catalyst of claim 2 for the production of hydrogen-rich gases, namely, synthesis gas and reducing gas, or for the production of methane-rich gases, namely, town's gas and pipe-line gas.

8. The process of claim 6 employing the catalyst of claim 4 for the production of hydrogen-rich gases, namely, synthesis gas and reducing gas, or for the production of methane-rich gases, namely, town's gas and pipe-line gas.

9. The process of claim 6 employing the catalyst of claim 5 for the production of hydrogen-rich gases, namely, synthesis gas and reducing gas, or for the production of methane-rich gases, namely, town's gas and pipe-line gas.

10. The process of claim 6 employing the catalyst of claim 3 for the production of hydrogen-rich gases, namely, town's gas and pipe-line gas.

11. The process of claim 10 for producing a synthesis gas product from gaseous or liquid hydrocarbon feedstock, for which the operating conditions include reactor outlet temperature of 1,300° to 1,800° F., pressure of 50 to 1,000 psig, steam-to-carbon ratio or 1.0 to 3.5, and $C_1$ equivalent space velocity of 100 to 4,000 v/hr/v.

12. The process of claim 10 for producing a reducing gas product from gaseous hydrocarbon feedstock, for which the operating conditions include reactor outlet temperature of 1,800° to 2,200° F., pressure of 0 to 150 psig, steam-to-carbon ratio of 0.9 to 1.3, and $C_1$ equivalent space velocity of 100 to 2,000 v/hr/v.

13. The process of claim 10 for producing town's gas with moderately high heating value of about 500 B.T.U. per standard cubic foot from hydrocarbon containing at least two carbon atoms per molecule, for which the operating conditions include reactor outlet temperature of 700° to 1,200° F., pressure of 300 to 800 psig, steam-to-carbon ratio of 1.2 to 3.5, and $C_1$ equivalent space velocity of 1,000 to 20,000 v/hr/v.

14. The process of claim 10 for producing pipe-line gas containing at least 90 mole percent of methane, for which the processing steps being first producing a methane-rich gas under conditions suitable for town's gas production followed by a methanation step at temperature of 400° to 800° F., pressure of 300 to 800 psig, C equivalent space velocity of 1,000 to 10,000, and steam-to-carbon ratio of 0 to 1 based on the total carbon atoms including carbon oxides in the feed for the methanation step.

15. A method of preparing a rare earth oxide stabilized, cobalt promoted nickel catalyst useful for steam reforming of hydrocarbons and methanation reaction to produce hydrogen-rich and methane-rich gases, comprising the steps of:

(a) impregnating a refractory support material with a solution of at least one rare earth salt to provide a composite material;

(b) drying the composite material resulting from step (a) at about 250° F., followed by calcining it at temperature of 400° to 3,000° F.;

(c) then impregnating the calcined composite material resulting from step (b) with a solution of cobalt and nickel salts;

(d) drying the composite material resulting from step (c) at 250° F. followed by calcining at temperature of 400° to 3,000° F.

* * * * *